United States Patent
Chen et al.

(10) Patent No.: US 11,941,840 B2
(45) Date of Patent: Mar. 26, 2024

(54) METHOD AND APPARATUS FOR HAND-OFF AND TRACKING FOR POSE ESTIMATION OF A FIDUCIAL MARKER

(71) Applicant: THE BOEING COMPANY, Chicago, IL (US)

(72) Inventors: Yang Chen, Malibu, CA (US); Deepak Khosla, Malibu, CA (US); David Huber, Malibu, CA (US); Brandon M. Courter, North Charleston, CA (US); Shane E. Arthur, Seattle, WA (US); Chris A. Cantrell, Seattle, WA (US); Anthony W. Baker, Ridley Park, PA (US)

(73) Assignee: THE BOEING COMPANY, Chicago, IL (US)

( * ) Notice: Subject to any disclaimer, the term of this patent is extended or adjusted under 35 U.S.C. 154(b) by 292 days.

(21) Appl. No.: 17/448,294

(22) Filed: Sep. 21, 2021

(65) Prior Publication Data
US 2023/0090757 A1 Mar. 23, 2023

(51) Int. Cl.
*G06T 7/73* (2017.01)
*B25J 9/16* (2006.01)
(Continued)

(52) U.S. Cl.
CPC ............... *G06T 7/73* (2017.01); *B25J 9/1697* (2013.01); *H04N 23/69* (2023.01); *H04N 23/695* (2023.01); *G06T 2207/30208* (2013.01)

(58) Field of Classification Search
CPC ... G06T 7/73; G06T 2207/30208; G06T 7/74; G06T 2207/10004; G06T 2207/30164;
(Continued)

(56) References Cited

U.S. PATENT DOCUMENTS

| 8,396,282 B1 | 3/2013 | Huber et al. |
| 8,995,712 B2 | 3/2015 | Huang et al. |

(Continued)

FOREIGN PATENT DOCUMENTS

| CN | 111340857 A | 6/2020 |
| EP | 3 706 080 A1 | 9/2020 |

(Continued)

OTHER PUBLICATIONS

Extended European Search Report received for European Application No. 22180106.1, dated Jan. 4, 2023, 11 pages.
(Continued)

*Primary Examiner* — Chuong A Ngo
(74) *Attorney, Agent, or Firm* — ALSTON & BIRD LLP

(57) ABSTRACT

Apparatuses and methods determine the three-dimensional position and orientation of a fiducial marker and tracking the three-dimensional position and orientation across different fields-of-view. Methods include: capturing an image of a first space in which the fiducial marker is disposed with a first sensor having a first field-of-view; determining the three-dimensional location and orientation of the fiducial marker within the first space based on the image of the first space in which the fiducial marker is disposed; capturing an image of a second space in which the fiducial marker is disposed with a second sensor having a second field-of-view; calculating pan and tilt information for the second sensor to move the second field-of-view of the second sensor to acquire an image of the fiducial marker; and determining the three-dimensional location and orientation of the fiducial marker within the second space based on the image of the second space.

20 Claims, 8 Drawing Sheets

(51) Int. Cl.
*H04N 23/69* (2023.01)
*H04N 23/695* (2023.01)

(58) Field of Classification Search
CPC .......... G06T 2207/30244; G06T 7/0008; B25J 9/1697; H04N 23/69; H04N 23/695
See application file for complete search history.

(56) References Cited

U.S. PATENT DOCUMENTS

| | | | |
|---|---|---|---|
| 10,373,336 | B1 | 8/2019 | Islam et al. |
| 10,839,557 | B1 | 11/2020 | Arora et al. |
| 11,688,100 | B1 | 6/2023 | Sun et al. |
| 2014/0132729 | A1 | 5/2014 | Foulk et al. |
| 2017/0094251 | A1 | 3/2017 | Wolke et al. |
| 2017/0287166 | A1 | 10/2017 | Claveau et al. |
| 2018/0322657 | A1 | 11/2018 | Dubout et al. |
| 2019/0332096 | A1* | 10/2019 | Porter .................. G06Q 10/087 |
| 2019/0364206 | A1 | 11/2019 | Dal Mutto et al. |
| 2020/0273138 | A1* | 8/2020 | Chavez ..................... G06T 7/10 |
| 2020/0318946 | A1 | 10/2020 | Wolke |
| 2022/0230348 | A1 | 7/2022 | Huber et al. |
| 2023/0086050 | A1 | 3/2023 | Feldman et al. |

FOREIGN PATENT DOCUMENTS

| | | | |
|---|---|---|---|
| SG | | 191452 A1 | 7/2013 |
| WO | WO 2019/045721 A1 | | 3/2019 |

OTHER PUBLICATIONS

Alvarez, L. et al., "Accurate depty dependent lens distortion models: an application to planar view scenarios," J. Math Imaging Vis., 39:75-85, (Jan. 2011).

Byeon, M. et al., "Variational interference for 3-D localization and tracking of multiple targets using multiple cameras," IEEE Transactions on Neural Networks and Learning Systems, 30(11):3260-3274, (2019).

Byun et al., "Accurate control of a pan-tilt system based on parameterization of rotational motion," arXiv preprint arXiv:1812.00232, 2018.

Camera Calibration and 3D Reconstruction, https://docs.opencv.org/2.4/modules/calib3d/doc/camera_calibration_and_3d_reconstruction.htm.

Davis et al., "Calibrating pan-tilt cameras in wide-area surveillance networks," In Proceedings of the Ninth IEEE International Conference on Computer Vision, IEEE Computer Society, vol. 2, p. 144, 2003.

Ercan, A. et al., "Object tracking in the presence of occulusions using multiple cameras: A sensor network approach," ACM Transactions on Sensor Networks (TOSN), 9(2):1-36, (2013).

Lu, Z. et al., "Camera calibration method with focus-related intrinsic parameters based on the thin-lens model," Optics Express, 28(14):20858-20878, (Jul. 2020).

Wu, B. et al., "A flexible method for zoom lens calibration and modeling using a planar checkboard," Photogrammetric engineering and remote sensing, 79(6):555-571, (Jun. 2013).

Wu, Z. et al., "Keeping a pan-tilt-zoom camera calibrated," IEEE Transactions on Pattern Analysis and Machine Intelligence, 35(8):994-2007, (2012).

You, Q. et al., "Real-time 3D Deep Multi-Camera Tracking," arXiv preprint arXiv:2003.11753.

Zhang, Z., "A flexible newtechnique for camera calibration," IEEE Transactions on Pattern Analysis and Machine Intelligence, 22(11):1330-1334, (2000).

Michel Sarkis et al., "Calibrating an Automatic Zoom Camera With Moving Least Squares," IEEE Transactions on Automation Science and Engineering, 6(3):492-503, (Jul. 2009).

Reg G. Willson, "Modeling and Calibration of Automated Zoom Lenses," Technical Report CMU-RI-TR-94-03, The Robotics Institute, Carnegie Mellon University, 189 pages, (Jan. 1994).

Shunyi Zheng et al., "Zoom lens calibration with zoom- and focus-related intrinsic parameters applied to bundle adjustment," ISPRS Journal of Photogrammetry and Remote Sensing, 102:62-72, (2015).

Extended European Search Report received for European Application No. 22178289.9, dated Dec. 9, 2022, 11 pages.

OpenCV Open Source Computer Vision, "Detection of ChArUco Boards," 5 pages, (May 16, 2021). [Retrieved from the Internet Dec. 12, 2023: <URL: https://docs.opencv.org/3.4/df/d4a/tutorial_charuco_detection.html>].

* cited by examiner

METHOD AND APPARATUS FOR HAND-OFF AND TRACKING FOR POSE ESTIMATION OF A FIDUCIAL MARKER

TECHNOLOGICAL FIELD

An example embodiment relates generally determining a three-dimensional position and orientation of a fiducial marker and, more particularly, to determining the three-dimensional position and orientation of a fiducial marker and tracking the three-dimensional position and orientation across different fields-of-view.

BACKGROUND

A number of applications are dependent upon the determination of the position of a fiducial marker. However, the position of a fiducial marker alone is not be sufficient and, instead, six degree of freedom (DOF) pose information, that is, information defining the three-dimensional position and orientation, of the fiducial marker must be determined to locate and interact with the fiducial marker with sufficient precision. In this regard, the three-dimensional position and orientation are defined in terms of x, y and z coordinates for the three-dimensional position and pitch, roll and yaw for the orientation.

For example, a fiducial marker of an example embodiment needs to be identified, such as in terms of six DOF pose information, in conjunction with various manufacturing operations, such as manufacturing operations to be performed in an automated or robotic manner. For example, automated painting operations, drilling operations, cutting operations, finishing operations and other manufacturing operations frequently require the precise determination of the three-dimensional position and orientation of the various tools utilized by a robot. As such, a fiducial marker is attached to the robot manipulator which engages the various tools. By precisely identifying the fiducial marker in terms of its three-dimensional position and orientation, the position and orientation of the robot manipulator and, in turn, the tools utilized by the robot are determined, thereby allowing the manufacturing operations to be performed in precise positions. Further, movement required in relation to the performance of the manufacturing operations are precisely performed utilizing closed loop control based upon the six DOF pose information for the fiducial marker.

Metrology techniques utilized to determine the six DOF pose information for a fiducial marker require relatively expensive equipment, such as one or more laser range finders, projectors, etc. This equipment is generally not only expensive, but may be appropriate for only a limited number of tasks and oftentimes must be manually calibrated, thereby increasing both the time required to identify a fiducial marker and the training or experience required of a technician in order to calibrate the specialized equipment. Additionally, at least some of the equipment, such as the sensors, utilized by metrology techniques to determine the six DOF pose information of a fiducial marker must remain fixed in position following calibration. In this regard, a plurality of sensors, that is, a sensor wall, are configured to obtain images of different portions of a space in which the fiducial marker is disposed. This constraint limits the utility of at least some of the equipment, particularly in instances in which a plurality of sensors are utilized in combination, since movement of the equipment following calibration will require that the calibration process be repeated, thereby extending the time required to identify a fiducial marker, such as in terms of the six DOF pose information.

Additionally, visual metrology, such as utilized in conjunction with the identification of a fiducial marker for manufacturing operations, generally requires a relatively high level of accuracy. As such, metrology techniques developed for other applications, such as for wide-area surveillance applications, that require less accuracy are incapable of determining the six DOF pose information of a fiducial marker with the accuracy demanded by at least some applications, such as those involving manufacturing operations.

BRIEF SUMMARY

An apparatus and method are provided for determining a three-dimensional position and orientation of a fiducial marker and, more particularly, to determining the three-dimensional position and orientation of a fiducial marker and tracking the three-dimensional position and orientation across different fields-of-view. Further, the method and apparatus of an example embodiment is implemented using commercial sensors and permits repositioning of the sensors following calibration, at least about pan and tilt axes, without a requirement for additional calibration, thereby increasing the ease with which a fiducial marker is identified and its global 3D position and orientation accurately measured.

Embodiments provided herein include an apparatus for tracking a three-dimensional location and orientation of a fiducial marker across two or more fields-of-view, the apparatus including: a first sensor having a first field-of-view configured to acquire a first image of a workspace in which the fiducial marker is disposed; a control system configured to determine the three-dimensional location and orientation of the fiducial marker within the workspace based on the first image of the workspace in which the fiducial marker is disposed; and a second sensor having a second field-of-view to acquire a second image of a second space, different from the workspace, where the control system calculates first pan and tilt information for the second sensor to move the second field-of-view of the second sensor to acquire a fiducial marker image, where the control system is configured to determine the three-dimensional location and orientation of the fiducial marker within the second space based on the fiducial marker image.

According to an example embodiment, the first sensor includes a wide field-of-view sensor, where the second sensor includes a narrow field-of-view sensor, and where the second space is of a portion of the workspace. Embodiments optionally include a third sensor including a narrow field-of-view sensor configured to capture a third image of a third space, where the third space is of a portion of the workspace that does not overlap the second space, the control system configured to provide the three-dimensional location and orientation of the fiducial marker as it moves from the second space to the third space based on images captured by the first sensor. The three-dimensional location and orientation of the fiducial marker within the workspace is determined, in some embodiments, in a global coordinate frame, and the three-dimensional location and orientation of the fiducial marker within the second space is determined in the global coordinate frame.

The apparatus of an example embodiment includes a first pan-tilt unit supporting the second sensor to controllably alter a first pan angle and a first tilt angle at which the second sensor is positioned relative to the fiducial marker such that the second sensor is configured to acquire images of the fiducial marker at different pan and tilt angles. The control system of an example embodiment is configured to cause the first pan-tilt unit to move according to the first pan and tilt information for the second sensor. The apparatus of an example embodiment further includes a third sensor having a third field-of-view configured to acquire a third image of a third space, different from the workspace and the second space, and a second pan-tilt unit supporting the third sensor and to controllably alter a second pan angle and a second tilt angle at which the third sensor is positioned, where the control system is further configured to cause the second pan-tilt unit to move according to calculated second pan and tilt information for the third sensor based on the three-dimensional location and orientation of the fiducial marker within the second space.

Embodiments provided herein include a method for tracking a three-dimensional location and orientation of a fiducial marker across two or more fields-of-view, the method including: capturing a first image of a workspace in which the fiducial marker is disposed with a first sensor having a first field-of-view; determining the three-dimensional location and orientation of the fiducial marker within the workspace based on the first image of the workspace in which the fiducial marker is disposed; capturing a second image of a second space in which the fiducial marker is disposed with a second sensor having a second field-of-view; calculating first pan and tilt information for the second sensor to move the second field-of-view of the second sensor to acquire a fiducial marker image; and determining the three-dimensional location and orientation of the fiducial marker within the second space based on the fiducial marker image.

According to some embodiments, the first sensor is a wide field-of-view sensor, the second sensor is a narrow field-of-view sensor, and the second space is a portion of the workspace. The method of an example embodiment includes capturing a third image of a third space with a third sensor having a narrow field-of-view, where the third space is of a portion of the workspace that does not overlap the second space; and providing a three-dimensional location and orientation of the fiducial marker as it moves from the second space to the third space. According to some embodiments, the three-dimensional location and orientation of the fiducial marker within the workspace is determined in a global coordinate frame, where three-dimensional location and orientation of the fiducial marker within the second space is determined in the global coordinate frame.

According to some embodiments, methods include controllably altering a first pan angle and a first tilt angle at which the second sensor is positioned relative to the fiducial marker with a first pan-tilt unit attached to the second sensor such that the second sensor is configured to acquire images of the fiducial marker at different pan and tilt angles. The method of an example embodiment includes causing the first pan-tilt unit to move according to the first pan and tilt information for the second sensor. The method of an example embodiment further includes acquiring a third image of a third space, different from the workspace and the second space with a third sensor having a third field-of-view; controllably altering a second pan angle and a second tilt angle at which the third sensor is positioned using a second pan-tilt unit supporting the third sensor; and causing the second pan-tilt unit to move according to the calculated second pan and tilt information for the third sensor based on the three-dimensional location and orientation of the fiducial marker within the second space.

Embodiments provided herein include a system for tracking a three-dimensional location and orientation of a fiducial marker across two or more fields-of-view, the system including: a wide field-of-view camera configured to acquire a first image of a workspace in which the fiducial marker is disposed; a control system configured to determine the three-dimensional location and orientation of the fiducial marker within the workspace based on the first image of the workspace in which the fiducial marker is disposed; a narrow field-of-view camera configured to acquire a second image of a second space, different from the workspace, where the second space is a portion of the work space; and a first pan-tilt unit coupled to the narrow field-of-view camera configured to controllably adjust a first pan angle and a first tilt angle of the narrow field-of-view camera to capture different areas of the workspace, where the control system calculates the pan and tilt information for the narrow field-of-view camera to move a field-of-view of the narrow field-of-view camera using the first pan-tilt unit to acquire a fiducial marker image, where the control system is configured to determine the three-dimensional location and orientation of the fiducial marker within the second space based on the fiducial marker image.

According to an example embodiment, the narrow field-of-view camera is a first narrow field-of-view camera, the system further including a second narrow field-of-view camera configured to capture an image of a third space, where the third space is of a portion of the workspace that does not overlap the second space, the control system configured to provide the three-dimensional location and orientation of the fiducial marker as it moves from the second space to the third space based on images captured by the wide field-of-view camera. According to some embodiments, the three-dimensional location and orientation of the fiducial marker within the workspace is determined in a global coordinate frame, and where the three-dimensional location and orientation of the fiducial marker within the second space is determined in the global coordinate frame. The control system of an example embodiment is further configured to cause the first pan-tilt unit to move according to the first pan and tilt information for the narrow field-of-view camera.

According to an example embodiment, the narrow field-of-view camera is a first narrow field-of-view camera, the system further including a second narrow field-of-view camera configured to capture a third image of a third space different from the workspace and the second space; and a second pan-tilt unit supporting the second narrow field-of-view camera and to controllably alter a second pan angle and a second tilt angle at which the second narrow field-of-view camera is positioned, where the control system is further configured to cause the pan-tilt unit to move according to calculated second pan and tilt information for the second narrow field-of-view camera based on the three-dimensional location and orientation of the fiducial marker within the second space. According to an example embodiment, the control system is configured to determine the three-dimensional location and orientation of the fiducial marker within the second space based on the fiducial marker image and based on a dynamic extrinsic model of the narrow field-of-view camera.

BRIEF DESCRIPTION OF THE DRAWINGS

Figure 1:
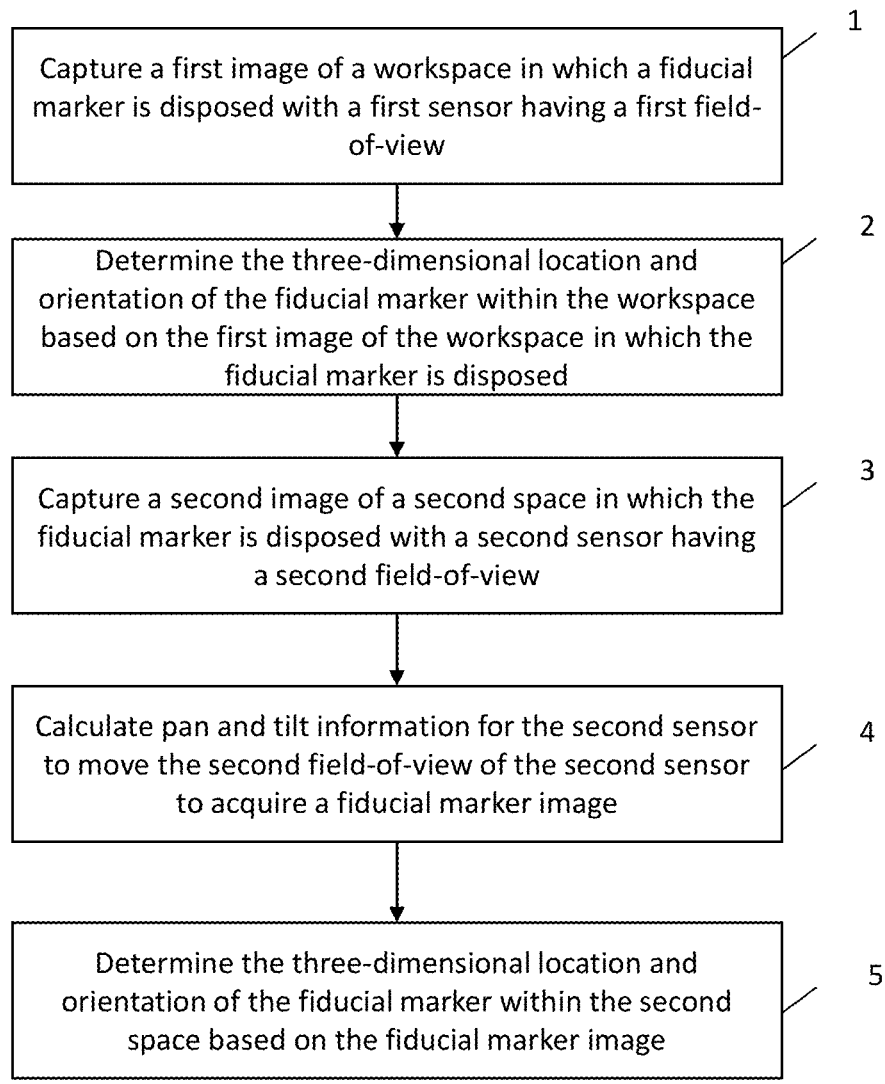
Figure 2:
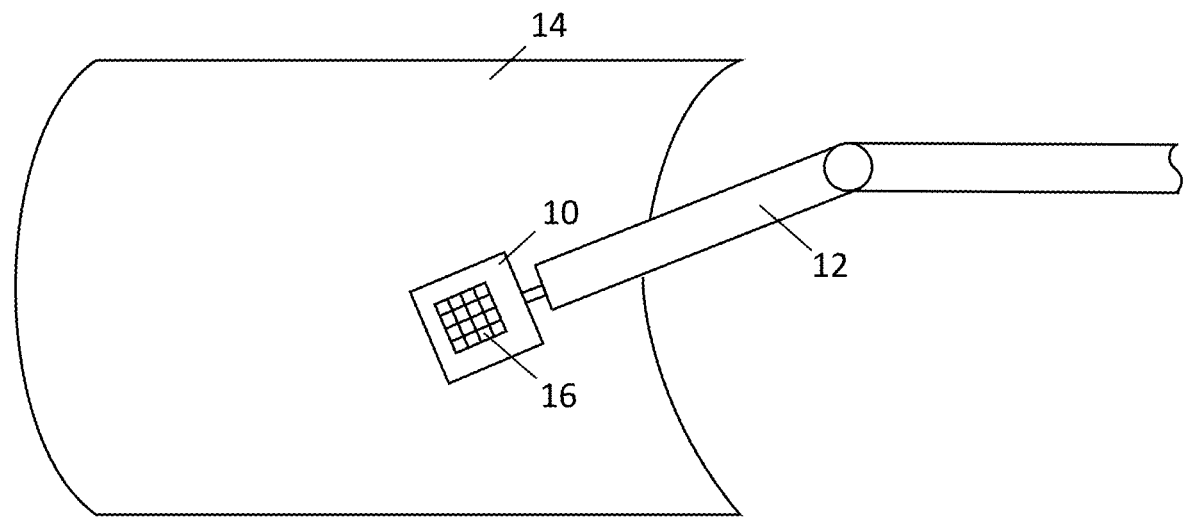
Figure 3:
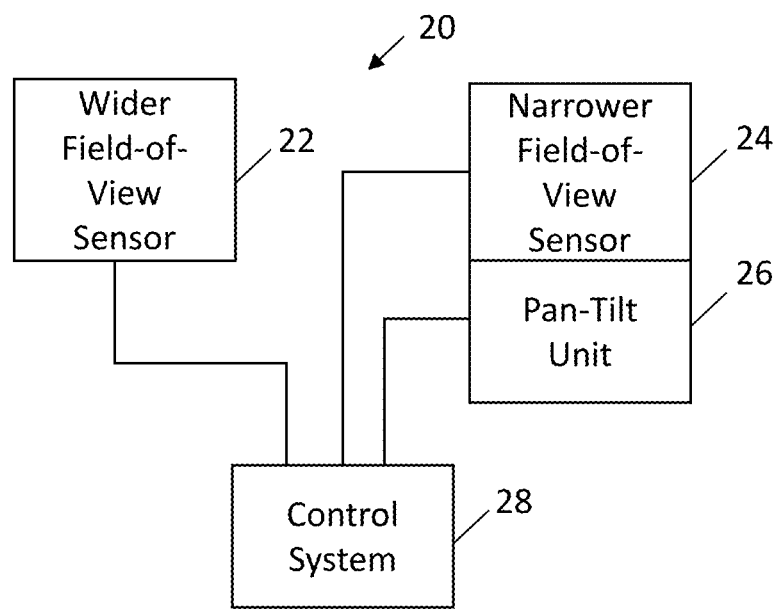
Figure 4:
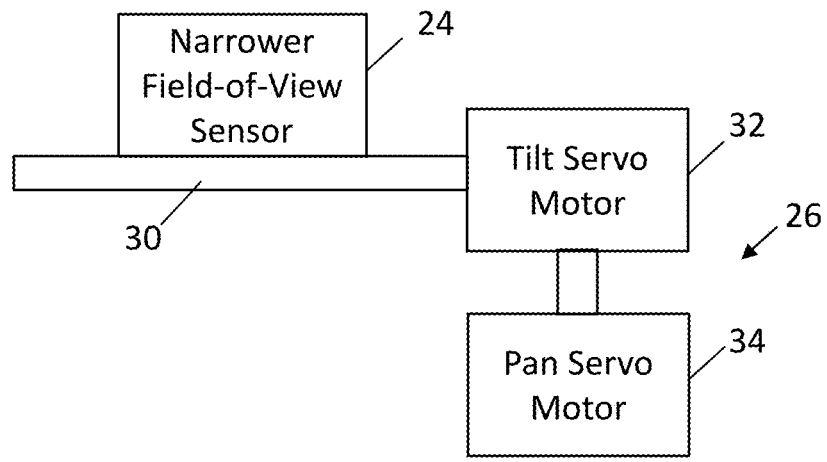
Figure 5:
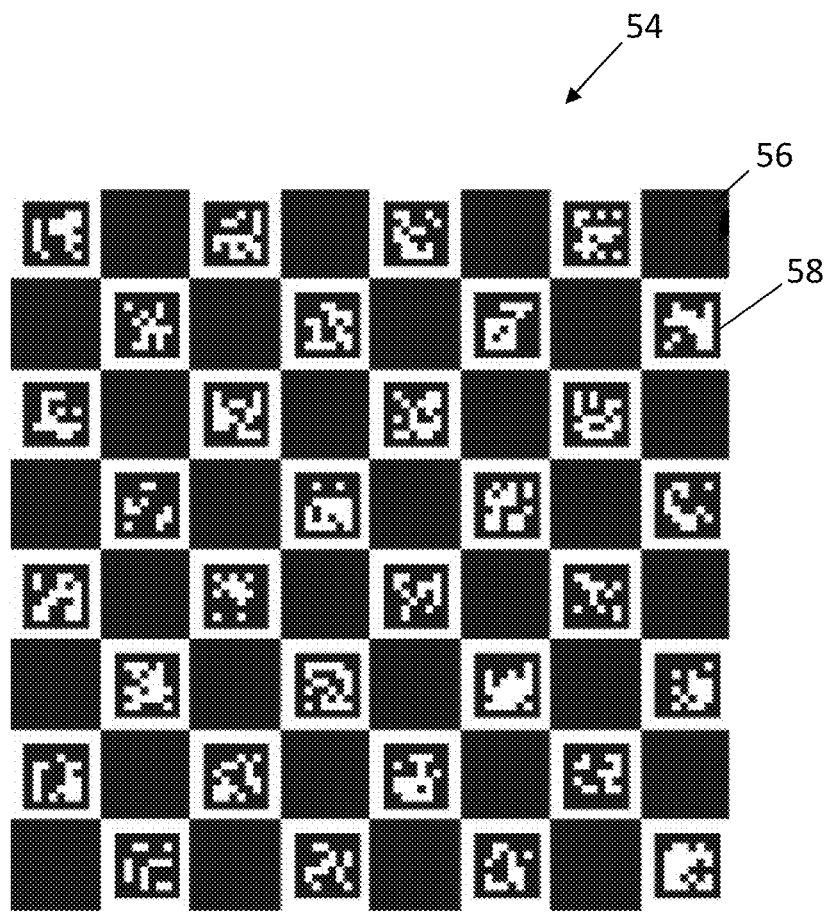
Figure 6:
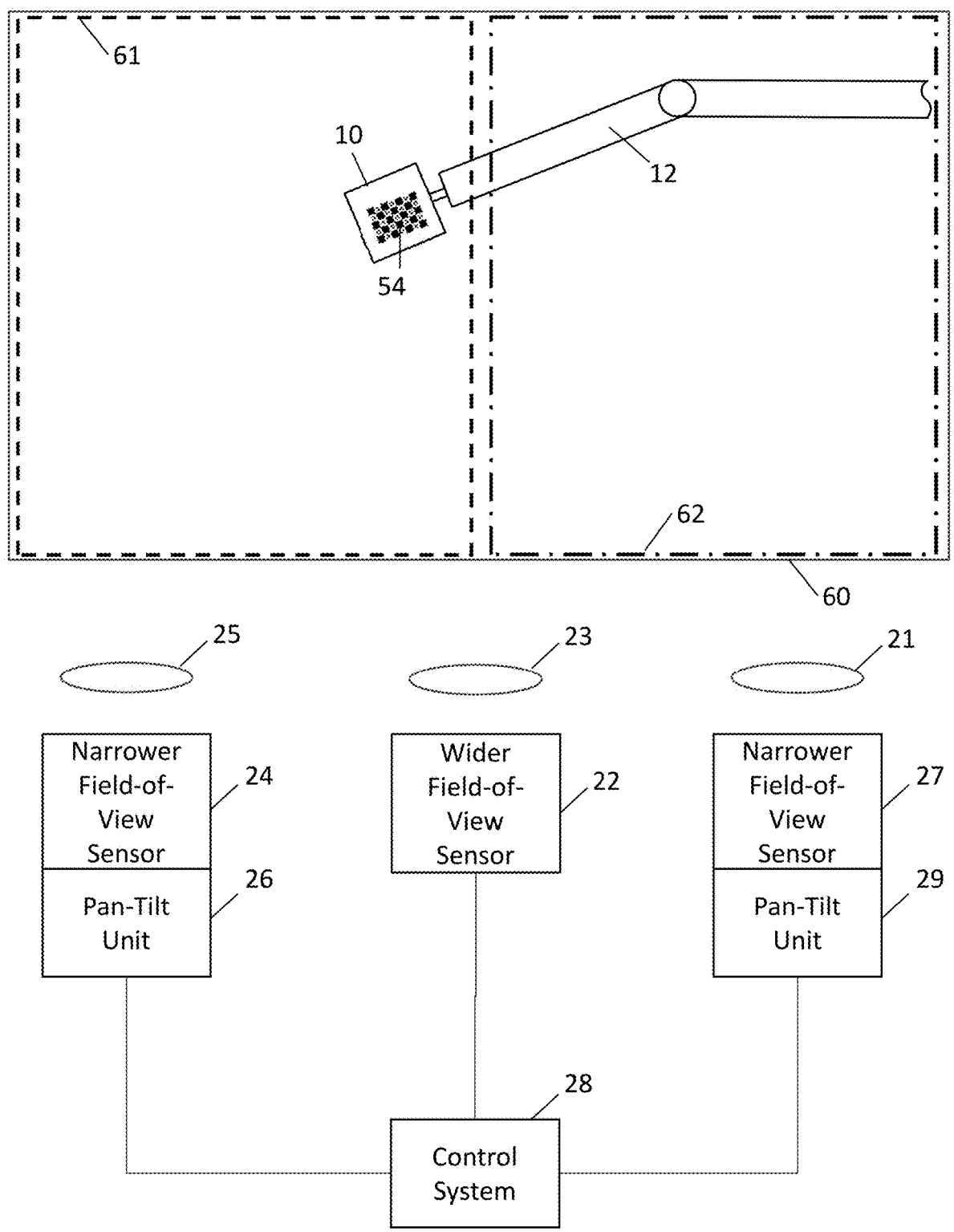
Figure 7:
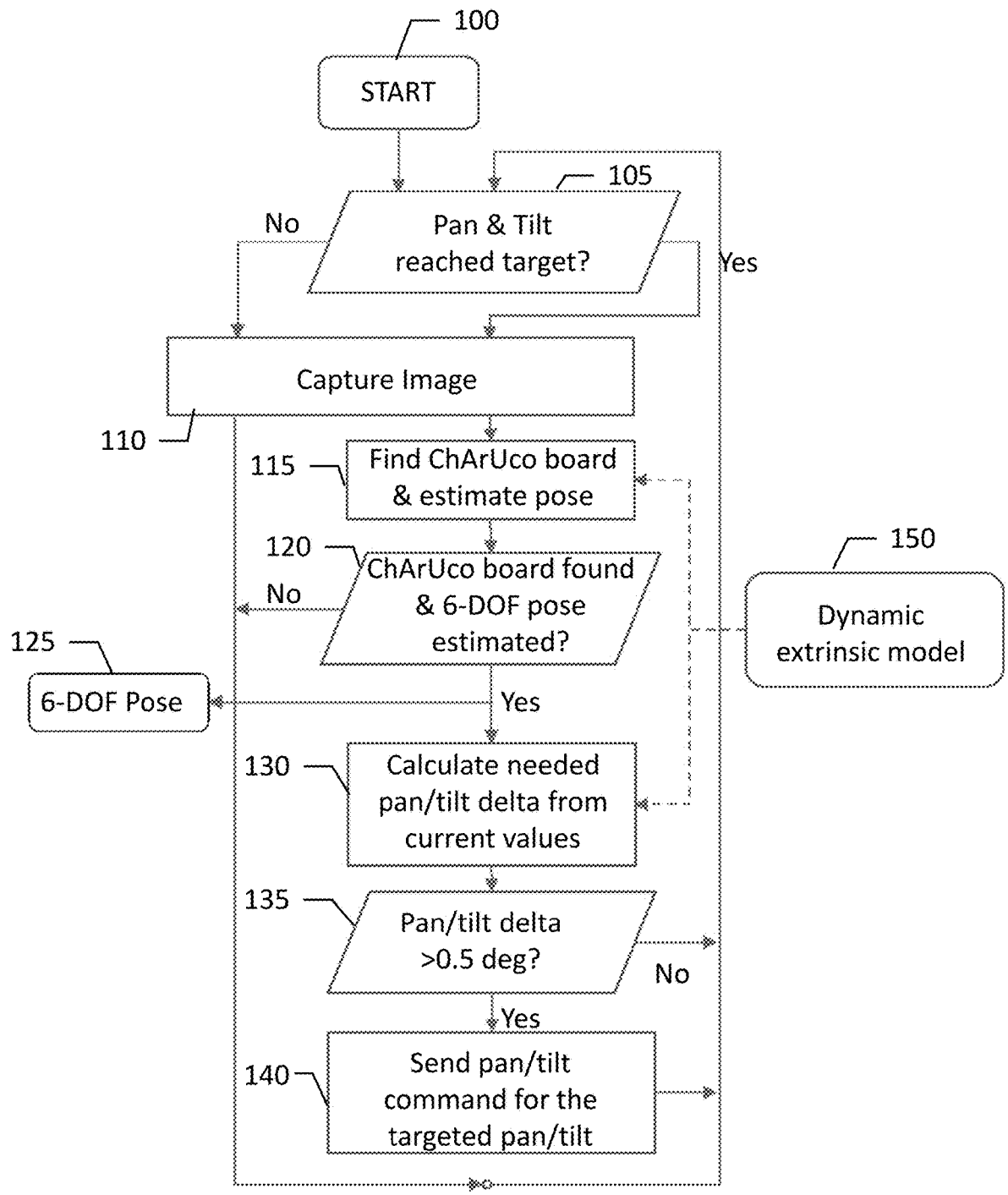
Figure 8:
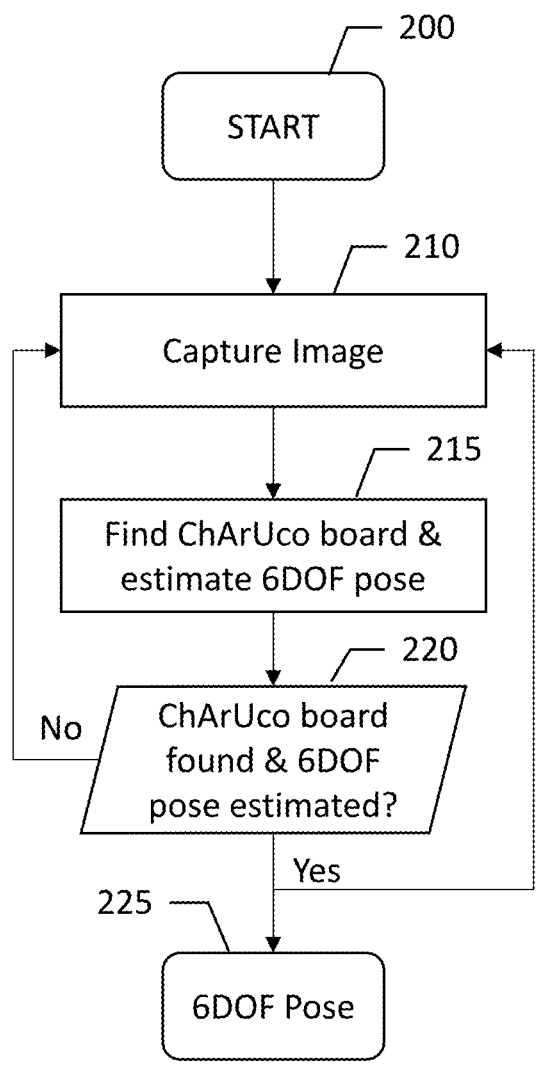
Figure 9:
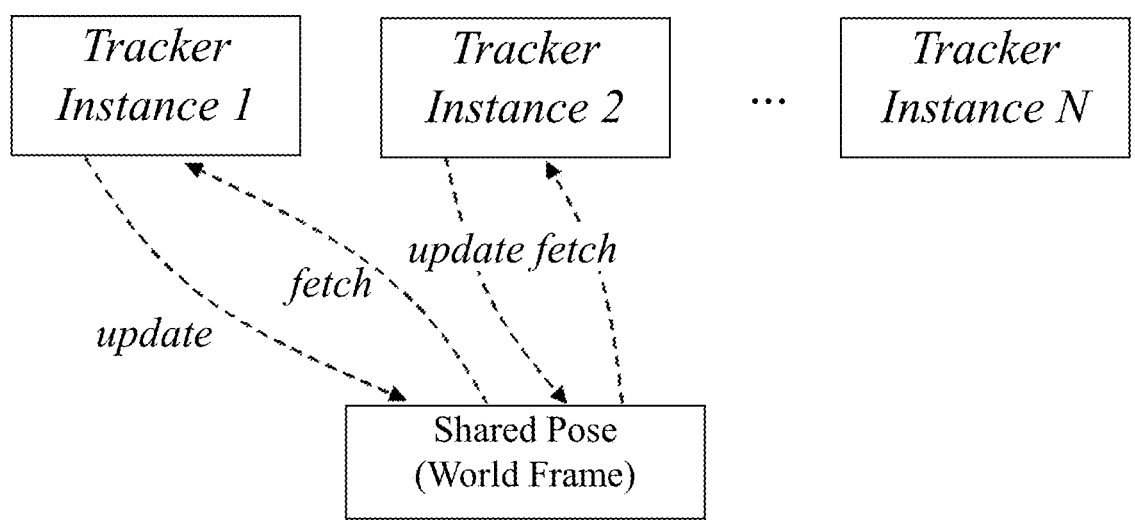
Figure 10:
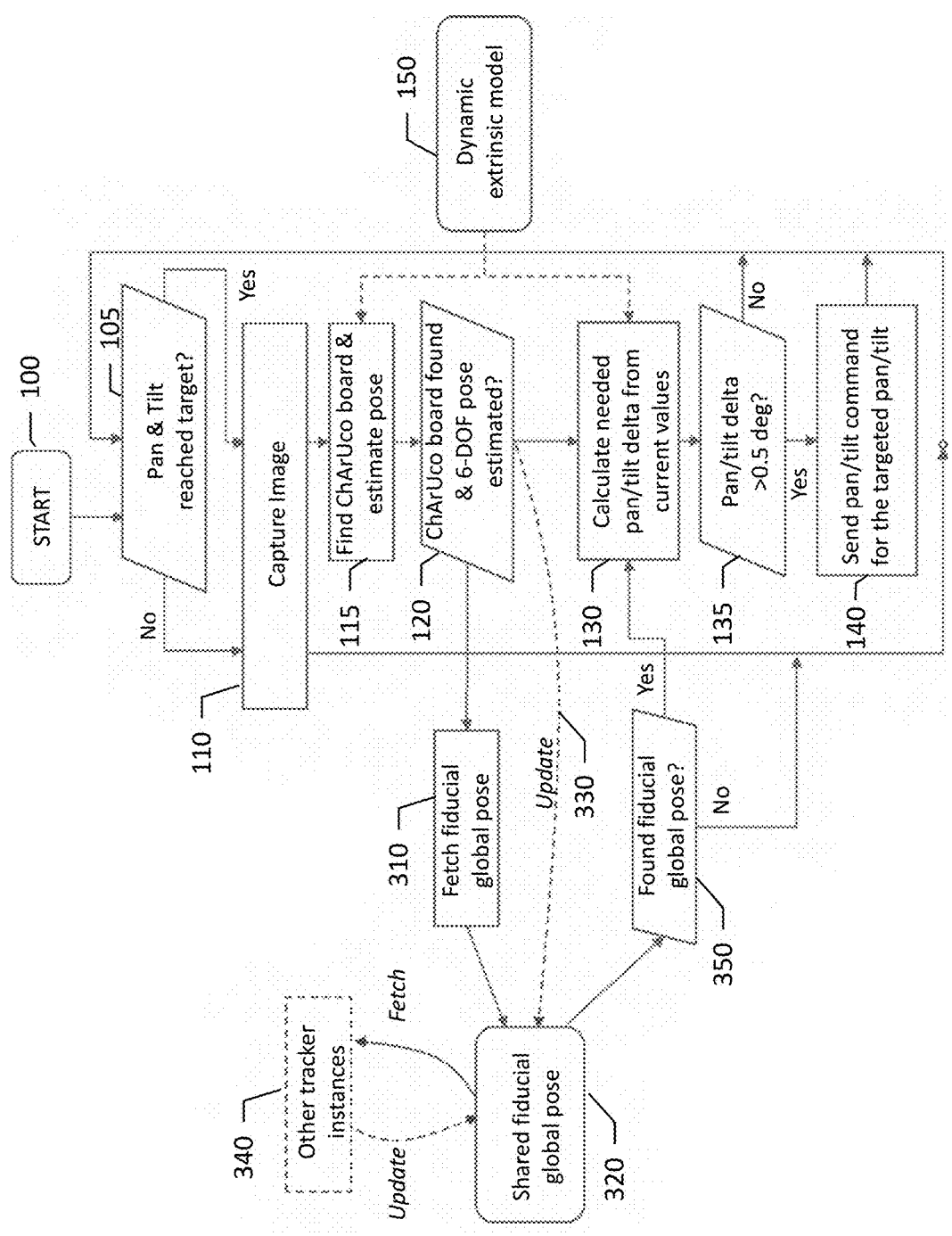

Having thus described certain example embodiments of the present disclosure in general terms, reference will here- inafter be made to the accompanying drawings, which are not necessarily drawn to scale, and wherein:

FIG. 1 is a flowchart of a method for determining the three-dimensional position and orientation of a fiducial marker and tracking the three-dimensional position and orientation across different fields-of-view according to an example embodiment of the present disclosure;

FIG. 2 is a perspective view of a workpiece and an associated paint head for which the six degree of freedom (DOF) pose information, namely, position and orientation, is determined in accordance with an example embodiment of the present disclosures;

FIG. 3 illustrates an apparatus configured to determine the position and orientation of a fiducial marker in accordance with an example embodiment of the present disclosure;

FIG. 4 depicts a pan-tilt unit and a narrow field-of-view sensor supported by the pan-tilt unit in accordance with an example embodiment of the present disclosure;

FIG. 5 illustrates a ChArUco board according to an example embodiment of the present disclosure;

FIG. 6 illustrates a workspace including a fiducial marker located on an end-of-arm-tool of a robotic arm according to an example embodiment of the present disclosure and a system including a wide field-of-view sensor and multiple narrow field-of-view sensors according to an example embodiment of the present disclosure;

FIG. 7 illustrates a flowchart of a tracking algorithm for tracking a single narrow field-of-view camera with pan angle and tilt angle control through a pan-tilt unit according to an example embodiment of the present disclosure;

FIG. 8 illustrates a flowchart of a diagram for fiducial marker tracking for a fixed wide field-of-view camera according to an example embodiment of the present disclosure;

FIG. 9 is a schematic of an extensible multi-camera fiducial tracking system according to an example embodiment of the present disclosure; and FIG. 10 is a flowchart of an interface between a narrow field-of-view camera and a global shared three-dimensional position and orientation according to an example embodiment of the present disclosure.

DETAILED DESCRIPTION

The present disclosure now will be described more fully hereinafter with reference to the accompanying drawings, in which some, but not all aspects are shown. Indeed, the disclosure is embodied in many different forms and should not be construed as limited to the aspects set forth herein. Rather, these aspects are provided so that this disclosure will satisfy applicable legal requirements. Like numbers refer to like elements throughout.

Embodiments described herein provide a method and apparatus for determining the precise three-dimensional (3D) location and orientation (collectively referred to as "pose" or "6 degree of freedom (DOF) pose") of a fiducial marker using multiple cameras and pan-tilt units (PTUs) that tracks the fiducial marker across individual fields-of-view of the cameras without requiring specialized equipment. Embodiments include one or more wide field-of-view (WFOV) static cameras that capture an entire workspace and provide approximate pose of the fiducial marker, and multiple narrow field-of-view (NFOV) cameras mounted on pan-tilt units providing detailed views of the fiducial marker and accurate estimates of the pose of the fiducial marker through the field-of-view of each narrow field-of-view sensor. As the fiducial moves through the workspace, each narrow field-of-view sensor tracks it, even across gaps in the coverage ("dead zones") and provides continuous 6DOF estimates coverage.

Tracking the 6DOF pose including the position and orientation of a robot end-effector or manipulator enables precise localization and monitoring of its movement, which is critical in automated manufacturing processes and makes closed-loop control possible. This is particularly important when a robot manipulator works across a large span of workspace and needs to achieve accurate positions or a path according to a specific plan. An example of such an application that requires precise robot manipulator control over a large workspace is inkjet printing on the surface of a large commercial aircraft.

Embodiments of the present disclosure enable high-speed metrology for closed-loop control. An example system includes a single global wide field-of-view sensor and one or more narrow field-of-view sensors mounted to a pan-tilt unit, which is used to determine the 6DOF pose information of a fiducial target at an arbitrary distance from the sensors. The fiducial marker is mounted, for example, on a paint head providing very accurate estimation of the 6DOF pose of the paint head using only simple sensors. An example embodiment is used to more accurately track a paint head in painting of a large surface, such as an aircraft, resulting in less paint used reducing both cost of the materials and reducing the weight of the aircraft due to a more even distribution of paint at a specific thickness. Accurate paint head positioning improves the weather protection afforded by a paint job by ensuring complete paint coverage of joints, rivets, etc. Embodiments save time by simplifying the metrology process and by reducing the amount of specialized equipment and the amount of calibration required to perform these tasks. Additionally, using multiple narrow field-of-view sensors expands the available workspace and allows the underlying 6DOF estimation process to be applied to larger spaces, such as warehouses or factory floors.

Embodiments presented herein include a system for precise tracking of a small fiducial marker using both fixed and pan-tilt mounted high-resolution video cameras. When such a fiducial marker is mounted on the robot end-effector with known relative position and orientation to the end-effector, embodiments precisely track the end-effector through the information provided by the fiducial marker. Tracking, as described herein, includes estimating the 6DOF pose of the fiducial marker over time in closely spaced time intervals, such as every tenth of a second. The accurate determination of the 3D pose in six degrees-of-freedom of a fiducial marker is used in conjunction with a wide variety of applications that are dependent upon the accurate identification of the fiducial marker.

FIG. 1 illustrates a method of determining the three-dimensional position and orientation (i.e., the 6DOF pose) of a fiducial marker and tracking the three-dimensional position and orientation across different fields of view. According to the flowchart, a first image of a workspace is captured in which a fiducial marker is disposed, the first image being captured by a first sensor having a first field-of-view as shown at 1. The three dimensional location and orientation of the fiducial marker within the workspace is determined at 2 based on the first image of the workspace in which the fiducial marker is disposed. A second image is captured at 3 of a second space in which the fiducial marker is disposed with a second sensor having a second field-of-view. Pan and tilt information is calculated at 4 for the second sensor to move the second field-of-view of the second sensor to acquire a fiducial marker image. The three-dimensional location and orientation of the fiducial marker is determined at 5 within the second space based on the fiducial marker image.

For example, a number of manufacturing operations are dependent upon the accurate identification and locating of one or more objects. As shown in FIG. 2 by way of example, but not of limitation, the accurate determination of the position and orientation of a paint head 10 carried by a robotic arm 12 relative to workpiece 14 is useful during painting operations such that the workpiece or at least specific portions of the workpiece are appropriately painted while other portions of the workpiece remain unpainted and previously painted portions of the workpiece are not unnecessarily repainted. By accurately identifying the position and orientation, otherwise known as pose, of the paint head 10 relative to the workpiece 14, the proper portion of the workpiece is painted in an efficient manner, thereby conserving resources during the manufacturing process. In this regard, as a result of the accurate determination of the position and orientation of the paint head 10 relative to the workpiece 14, paint is conserved by uniformly applying a coat of paint of a desired thickness, while not unnecessarily re-painting previously painted surfaces, thereby also avoiding undesirable increases in the weight of the aircraft. Further, by accurately determining the position and orientation of the paint head 10 relative to the workpiece 14 and correspondingly ensuring that all portions of the workpiece that are intended to be painted have, in fact, been painted, the resulting appearance of the workpiece is improved along with the weather protection of the aircraft offered by the paint.

Although described above in conjunction with the accurate determination of the position of a paint head 10 relative to a workpiece 14, the method and apparatus of an example embodiment is also used to accurately determine the position and orientation of any of a variety of objects in conjunction with other manufacturing operations including drilling operations, cutting operations, etc. Further, the method and apparatus of an example embodiment is used in conjunction with the accurate determination of the position and orientation of an end effector, a robotic arm, or an object, such as the 6 DOF pose information, in applications other than manufacturing.

The apparatus 20 of an example embodiment is depicted in FIG. 3. The apparatus 20 includes one or more wide field-of-view sensors 22 and one or more narrow field-of-view sensors 24. Although different types of sensors may be utilized in order to acquire images, the sensors of an example embodiment are cameras configured to acquire images of the respective fields-of-view. The wide field-of-view sensor 22 has a wider field-of-view than the narrow field-of-view sensor 24. The wide field-of-view sensor 22 has a shorter focal length than the narrow field-of-view sensor 24. Additionally, while the wide field-of-view sensor 22 and the narrow field-of-view sensor 24 may have the same pixel resolution, the narrow field-of-view sensor of one example embodiment has a greater spatial resolution of the physical workspace than that of the wide field-of-view sensor. The wide field-of-view sensor 22 and the narrow field-of-view sensor 24 also generally disallow autofocus and have fixed zoom settings such that neither the focus distance nor the zoom setting changes.

According to an example embodiment, the wide field-of-view sensor 22 is fixed in position relative to the space in which the fiducial marker will be located. In this regard, the wide field-of-view sensor 22 is positioned such that the entire space in which the fiducial marker is located is acquired within the same image. For example, in an instance in which the fiducial marker could be positioned at any position upon a workpiece, the wide field-of-view sensor 22 is positioned such that a static image that is acquired includes the entire workpiece. Optionally, a workspace is covered by multiple fixed-position wide field-of-view sensors 22, particularly when the workspace is very large, such as a manufacturing floor, warehouse, or assembly line.

The narrow field-of-view sensor 24 is also generally positioned at a fixed position, such as a position having fixed x, y and z coordinates, although the narrow field-of-view sensor of another example embodiment is configured to be controllably repositioned, such as by mounting the narrow field-of-view sensor upon a rail that facilitates translation of the narrow field-of-view sensor along a predefined path defined by the rail. As described below, however, the narrow field-of-view sensor 24 is configured to rotate about a pan axis and a tilt axis. The narrow field-of-view sensor 24 is configured to acquire an image of a portion of the same space that is acquired by the static image of the wide field-of-view sensor 22. However, the narrow field-of-view sensor 24 generally does not acquire an image that includes the entire space, but instead only that portion of the space in which the fiducial marker is located.

As shown in FIG. 3, the apparatus 20 of an example embodiment also includes a pan and tilt unit or pan-tilt unit 26. The pan-tilt unit 26 is configured to support the narrower field-of-view sensor 24 and to controllably and separately alter a pan angle and a tilt angle at which the narrow field-of-view sensor is positioned relative to the space and, more particularly, relative to the fiducial marker located within the space. As such, the narrow field-of-view sensor 24 is configured to acquire images of a portion of the space, such as the portion of the space within which the fiducial marker is disposed, at different combinations of pan and tilt angles. As the fiducial marker may be positioned at any of various positions throughout the space, the pan-tilt unit 26 is configured to controllably reposition the narrow field-of-view sensor 24 in terms of the pan and tilt angles such that the narrow field-of-view sensor is capable of viewing the entire space within the static image captured by the wide field-of-view sensor 22, even though the narrow field-of-view sensor is only capable of viewing a portion of the entire space at any particular combination of pan and tilt angles.

Although the pan-tilt unit 26 may be configured in different manners, the pan-tilt unit of an example embodiment is depicted in FIG. 4 to include a platform 30 and an associated tilt servo motor 32 that is configured to controllably alter the tilt angle of the platform and, in turn, the tilt angle of the narrow field-of-view sensor 24. Additionally, the pan-tilt unit 26 of this example embodiment includes a pan servo motor 34 configured to controllably alter the pan angle of the platform 30 and, in some embodiments, both the platform and the tilt servo motor 32. By altering the pan angle of the platform 30, the pan servo motor 34 also controllably alters the pan angle of the narrow field-of-view sensor 24.

The apparatus 20 of FIG. 3 also includes a control system 28. The control system 28 is embodied in a variety of different manners including by a controller, a processor and any of a variety of computing devices, such as a personal computer, a computer workstation, a server, or the like. In an example embodiment, the control system 28 is configured to determine 6DOF pose (position and orientation) information determined from the images acquired by the narrow field-of-view sensor 24 for sharing with other sensors, both narrow field-of-view sensors 24 and wide field-of-view sensors 22 with respect to a world coordinate system, for the space from which the static image is acquired by the wide field-of-view sensor 22. In this regard, the 6DOF pose is consistently determined among all sensors of a system and shared among all sensors of a system for accuracy and consistency. Further, when a sensor loses track of the pose of a fiducial marker, embodiments share the pose such that a sensor quickly obtains a visual pose estimate of the fiducial marker within the workspace.

In another example embodiment, the control system 28 is configured to use pose information from one sensor to establish the pose of the fiducial marker by another sensor. This determination of the estimate of the position and orientation of a fiduciary marker is based on the images acquired from the wide field-of-view and narrow field-of-view sensors 22, 24 and also based on the pan and tilt angles at which the narrow field-of-view sensor is positioned relative to the fiducial marker upon acquiring the image. Thus, the control system 28 of this example embodiment is configured to determine the position and orientation of a fiducial marker in the world coordinate system in an efficient and reliable manner, such as in real time with a relatively small error, based on an image of a fiducial marker captured by the narrow field-of-view sensor 24 positioned at a particular combination of pan and tilt angles.

Embodiments described herein enable tracking of a fiducial marker around the workspace and across all of the narrow field-of-view camera fields-of-view. This enables the tracking and 6DOF system to work with a much larger workspace while permitting the narrow field-of-view sensors to increase their zoom level to cover a much smaller field-of-view, since multiple narrow field-of-view sensors are used to cover different areas of the workspace. As such, embodiments are employed not just for small workspaces, but for large workspaces that cover a wide area.

Fiducial tracking is a conventional problem; however, embodiments described herein combine fiducial tracking that incorporates multiple independent and dynamic narrow field-of-view sensors with a dynamic calibration procedure to extend the determine the global 6DOF pose of an object from a single narrow field-of-view to an arbitrary number of narrow field-of-view sensors. This process enables scalability of the system and its use in larger workspaces. Embodiments provide a scalable multi-camera system that tracks a fiducial marker across a large workspace covered by multiple narrow field-of-view cameras mounted on pan-tilt units by performing sensor fusion between the narrow field-of-view and wide field-of-view cameras. Embodiments track and maintain the pose of the fiducial marker using multiple sensors, even with a dead zone (area with no sensor coverage) between them through a hand-off. Embodiments are robust against sensor failure or occlusion. This provides continuous tracking of a fiducial marker using multiple narrow field-of-view sensors across all of their fields-of-view, even when the fiducial is in a 'blind spot' between the sensors where it cannot be seen by either narrow field-of-view sensor. Using one or more fixed global wide field-of-view sensors that have been calibrated to each other allow the system of example embodiments to maintain a constant view of the workspace and provide a single global coordinate frame that all other sensors in the system are calibrated against. Embodiments provided herein employ a calibration method to calibrate multiple narrow field-of-view sensors on pan-tilt units to this wide field-of-view sensor, as described in U.S. Provisional Patent Application 63/138,931, filed on Jan. 20, 2021 and entitled *Method and Apparatus for Determining a Three-Dimensional Position and Pose of a Fiducial Marker*.

Embodiments described herein determine the 3D position and orientation of a fiducial marker and track movement of that fiducial marker within a workspace across different narrow field-of-view sensor fields-of-view. The fiducial marker of an example embodiment is located coincident with an object for which the position and orientation is to be determined. As shown in FIG. 2, for example, the fiducial marker 16 is placed on and carried by an object to be identified, such as by being carried by a paint head 10 in order to determine the position and orientation of the paint head relative to a workpiece 14.

Various types of fiducial markers may be utilized including a ChArUco board. One example of a ChArUco board 54 is depicted in FIG. 5. A ChArUco board includes a ChArUco pattern which is a combination of a checkerboard 56 and a grid of ArUco markers 58. The checkerboard portions provide the structure required for the calibration and detection in order to determine position and orientation, while the ArUco markers identify specific sections of the ChArUco pattern. The ArUco markers therefore permit the ChArUco pattern to be utilized in instances in which only a partial or an occluded view of the ChArUco board is available since the ArUco markers permit the portion of the ChArUco board that is visible to be identified. While a ChArUco board is used in example embodiments described herein as a fiducial marker, other types of fiducial patterns may be utilized in other example embodiments.

Embodiments described herein employ algorithms for achieving accurate tracking of the fiducial marker that employ both the static, wide field-of-view sensor 22 and pan-tilt unit 26 mounted narrow field-of-view sensor 24 of the apparatus of FIG. 3. A first algorithm is a tracking hand-off algorithm that, given the 6DOF pose of the fiducial marker from another sensor, allows calculation of the pan-tilt angles for the narrow field-of-view sensor to pivot to the fiducial marker. This algorithm helps narrow field-of-view sensors at start up, when the global wide field-of-view sensor that has visibility to the entire workspace is the only sensor that has a view of the fiducial marker. The hand-off algorithm helps a narrow field-of-view sensor to regain the fiducial in cases where the sensor has lost track of the fiducial marker by leveraging information from the other sensors of the system. Another algorithm described herein allows the system to orchestrate an extendable set of narrow field-of-view and wide field-of-view sensors for fiducial tracking by using a single shared global fiducial pose object. The tracking instances associated with the sensors all work asynchronously, and this contributes to a shared global pose. When any sensor is in need of information (e.g., the sensor has lost sight of the fiducial marker), the sensor requests the current fiducial 6DOF pose from the shared global pose and execute a "hand off", allowing the sensor to quickly move to the correct pan and tilt position to view the fiducial marker target.

In an example embodiment, the control system 28 shown in FIG. 3 is first configured to detect the pattern of the fiducial marker, such as by utilizing the OpenCV library of vision functions, and to then determine the position and orientation of the fiducial marker in the local coordinate system of the narrow field-of-view sensor 24. In this example embodiment, the control system 28 employs a transformation, such as one based on a dynamic extrinsics model, to convert the position and orientation of the fiducial marker from the local coordinate system of the narrow field-of-view sensor 24 to the position and orientation to the fiducial marker in the global coordinate system, i.e., the world coordinate system, for the space for which the static image is acquired by the wide field-of-view sensor 22 based upon the pan and tilt angles of the pan-tilt unit 26.

The narrow field-of-view of the narrow field-of-view sensor 24 permits greater spatial resolution relative to the wide field-of-view sensor 22, such that the narrow field-of-view sensor is configured to acquire the image of at least a portion of fiducial marker with more pixels being representative of the fiducial marker than the static image acquired by the wide field-of-view sensor. By placing more pixels on the fiducial marker, the position and orientation of the fiducial marker is more accurately and reliably determined by reference to the image acquired by the narrow field-of-view sensor 24. Thus, the fusion of the information extracted from the images acquired by the wide field-of-view sensor 22 and the narrow field-of-view sensor 24 allows the apparatus 20 to achieve accurate position and orientation estimates commensurate to that of the narrow field-of-view sensors while maintaining a larger workspace coverage of the wide field-of-view sensor, a feat neither type of sensor can achieve by themselves alone.

FIG. 6 illustrates a system of example embodiments including components illustrated in FIG. 3. As shown, the system includes a first pan-tilt unit 26 coupled to a first narrow field-of-view sensor 24 and a second pan-tilt unit 29 coupled to a second narrow field-of-view sensor 27. These sensors have a narrow field-of-view of the workspace 60 in which a ChArUco board 54 fiducial marker is disposed on a paint head 10 of a robotic arm 12. The illustrated first narrow field-of-view sensor 24 and second narrow field-of-view sensor 27 include respective first lens 25 and second lens 21 that afford the sensors a relatively narrow field-of-view at a relatively high resolution, with each narrow field-of-view sensor having visibility of only a portion of the workspace 60. The first narrow field-of-view sensor 24 has visibility to a second space 61 which is a first portion of the workspace 60 illustrated by dash-dash border while the second narrow field-of-view sensor 27 has visibility to a third space 62 which is a second portion of the workspace 60 illustrated by dash-dot-dash border. The wide field-of-view sensor 22 includes a lens 23 that affords a relatively wider field-of-view at a relatively lower resolution of the entire workspace 60.

FIG. 7 illustrates a flowchart of the fiducial marker tracking system for a narrow field-of-view pan-tilt (dynamic) camera, while FIG. 8 illustrates a flowchart of the fiducial marker tracking system for a wide field-of-view global (fixed) camera. The difference between these two operations is that tracking the fiducial marker with the dynamic camera extracts information needed to control the pan-tilt unit, while the fixed camera does not require this and is therefore much simpler. In both cases, the result is the successful detection and estimation of the pose of the fiducial marker. This is the source of the global shared pose that the trackers will contribute to enable "hand off".

As shown in FIG. 7, starting at start 100, a determination is made at 105 if a pan and tilt target is reached. The pan and tilt unit is generally considered to be at the "target" position such that this operation is only meaningful on the second iteration and beyond. The operation of 105 results in "true" or "Yes" when the pan and tilt unit has reached the commanded target pan and tilt angles and is no longer in motion. If the pan and tilt target is not reached or "No", the camera image is captured at 110 for display and the system will later loop back to checking again. When the operation of 105 results in "Yes", the image is captured at 110, and the ChArUco board is found and pose estimated at 115. This operation involves two sub-steps, namely finding the ChArUco board and estimating its pose. Both elements are achieved by calling functions in the OpenCV open-source software package. Successful pose estimation yields the 6DOF pose information of the fiducial marker, which is updated after every successful iteration in which the board is detected, and its pose estimated. In order to estimate the 6DOF pose for the fiducial marker, the system of example embodiments requires information referred to herein as "dynamic extrinsics" which is a transformation matrix that converts the estimated pose of the fiducial in the narrow field-of-view camera's local coordinate frame to the global (or world) coordinate frame. In brief, the output of the pose estimation is represented in the narrow field-of-view camera's local camera coordinate frame. The dynamic extrinsics transformation is applied to this "local" pose estimate, which then gives the 6DOF fiducial pose in the global coordinate frame. In the system of example embodiments, the global coordinate frame coincides with that of the wide field-of-view sensor. If the fiducial marker is not found and pose not estimated, the method of FIG. 7 proceeds along the iterative path where the pan and tilt target is not reached in 105.

Once the pose of the fiducial marker is estimated in 115 (output at 125) and confirmed in 120, the needed pan/tilt delta from current values are calculated at 130. While the robot arm 12 of FIG. 6 is moving, carrying fiducial marker (e.g., ChArUco board 54) with it, the 6DOF pose of the fiducial marker changes from iteration to iteration. If the fiducial movement is large enough, the system will need to point the narrow field-of-view camera (e.g., narrow field-of-view sensor 24) at the fiducial marker using the pan-tilt unit (e.g., pan-tilt unit 26), such that the fiducial image is captured entirely. This is performed by calculating the pan and tilt angles needed to achieve this movement, and then comparing those angles with the current pan and tilt angles of the pan-tilt unit. The dynamic extrinsic model 150 is used to improve the pose estimate.

When the difference (i.e., the delta) between the needed pan or tilt angle and the current pan or tilt angle is greater than some threshold (e.g., 0.5 degrees as shown at 135), the pan-tilt unit is instructed to move the needed pan and tilt angles at 140. Since the pan-tilt unit is often very slow compared with the capture framerate of the narrow field-of-view sensors, the system cannot capture quality images from the cameras while the pan-tilt unit is in motion. Embodiments described herein increase the effective iteration speed. That is, by reducing the need to move the pan-tilt unit, the system of example embodiments increases the likelihood of capturing quality images of the fiducial, thus achieving optimal 6DOF pose estimation.

The tracking algorithm for the wide field-of-view sensor, as shown in the flowchart of FIG. 8, works similarly to that of the narrow field-of-view sensor; however, the wide field-of-view sensor is static and does not include a pan-tilt unit requiring adjustment, such that there is no need for the calculation of pan and tilt angles. Further, since the wide field-of-view sensor is chosen as the global reference frame, there is no need to convert the 6DOF pose estimated from the wide field-of-view sensor into any other reference frame. As such, the process of FIG. 8 begins at Start 200 and an image is captured at 210. As the image includes the entire workspace, any fiducial marker within the workspace is found. At 215, the ChArUco board is found and the 6DOF pose is estimated. Provided this occurs, the 6DOF pose is output at 225, otherwise, the image is re-captured, possibly with the fiducial marker position changed to reduce chances of not finding the fiducial marker a second time.

When the fiducial marker is not detected by the narrow field-of-view sensor, the system of example embodiments cannot provide 6DOF pose estimates of the fiducial marker. This occurs during initial startup of the system if the fiducial is not visible to the narrow field-of-view sensors, if there is an occlusion of the fiducial marker, or if the fiducial marker has otherwise moved out of the field-of-view of the narrow field-of-view sensor. Once lost, regaining the ability to detect the fiducial marker generally amounts to scanning the entire workspace by the narrow field-of-view sensor by moving the pan and tilt of the pan-tilt unit, which is time consuming and impractical. Thus, Applicant has developed an algorithm to compute the required pan and tilt angles to center the fiducial in the narrow field-of-view camera frame that leverages dynamic extrinsic calibration and the intrinsic parameters of the narrow field-of-view sensor. The inputs to the algorithm include the 3D position, $Pw=[Xw, Yw, Zw]^T$ of the fiducial marker in the global coordinate frame; the camera intrinsics of the narrow field-of-view (contemplated herein as the 3×3 camera matrix); the dynamic extrinsic parameters of the wide field-of-view-Pan/Tilt-narrow field-of-view sensor system; and the current pan and tilt angle values of the pan-tilt unit for each narrow field-of-view sensor.

The objective of this algorithm is to put the center of the ChArUco pattern in the center of the narrow field-of-view camera's field-of-view. However, the origin of the ChArUco board is used as the reference point for the fiducial marker for simplicity. The center and the origin of the fiducial marker are related to each other by the 6DOF pose of the fiducial marker. The dynamic intrinsics transformation is a 3×4 matrix that is a function of the pan and tilt angles of the pan-tilt unit. Thus, there will be a different 3×4 transformation matrix depending on the values of the current pan and tilt angles. From the pinhole camera model:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \end{bmatrix} \begin{bmatrix} X_w \\ Y_w \\ Z_w \\ 1 \end{bmatrix} \quad (1)$$

where u and v are the coordinates of the image of the 3D point Pw representing the ChArUco board fiducial, s is a scaling factor that is later determined, the values of $f_x$, $f_y$, $c_x$ and $c_y$ are the intrinsic parameters of the narrow field-of-view sensor forming the 3×3 camera matrix, and parameters $r_{11}$ through $r_{33}$ and $t_x$, $t_y$, $t_z$ form the 3×4 dynamic extrinsics matrix. The Equation (1) is rewritten as:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} P_c, P_c = \begin{bmatrix} r_{11} & r_{12} & r_{13} & t_x \\ r_{21} & r_{22} & r_{23} & t_y \\ r_{31} & r_{32} & r_{33} & t_z \end{bmatrix} \begin{bmatrix} X_W \\ Y_W \\ Z_W \\ 1 \end{bmatrix} \quad (2)$$

where $Pc=[Pc_0, Pc_1, Pc_2]^T$ is the fiducial 3D position in the local coordinate frame of the narrow field-of-view camera. To put the image of the fiducial (i.e., Pw) at the center of the narrow field-of-view sensor (i.e., to make u=image_width/2.0, and v=image_height/2.0), Equation (2) is rearranged to:

$f_x*Pc_0/Pc_2-(\text{image\_width}/2-c_x)=0$ $f_y*Pc_0/Pc_2-(\text{image\_height}/2-c_y)=0 \quad (3)$ Solving these equations results in the pan and tilt angles that define the 3×4 dynamic extrinsics matrix in Equation (2). However, these equations are non-linear, and there is no closed-form solution to them. Numerical methods are applied to find the solution to this problem by finding the least squares solution to Equation (3). A non-limiting example of such a method is the traditional Levenberg-Marquardt optimization algorithm. In using Levenberg-Marquardt algorithm, the current pan and tilt angles of the pan-tilt unit are used as the initial guess for the iterative numerical solution.

Example embodiments provided herein include an extensible multi-camera tracking module for the fiducial marker pose estimation using multiple narrow field-of-view sensors and at least one wide field-of-view sensor. FIG. 9 illustrates such an embodiment where there are N tracking instances that all execute fiducial tracking asynchronously, but exchange information through a Shared Pose object. Each tracker instance is either based on a narrow field-of-view sensor, in which case the algorithm of FIG. 7 is employed, or a wide field-of-view sensor, in which case the algorithm of FIG. 8 is employed. Wide field-of-view-based trackers only contribute to the Shared Pose by sending the updated fiducial pose. However, the narrow field-of-view-based trackers both contribute to the Shared Pose and can also fetch the fiducial pose if the narrow field-of-view sensor loses track of the fiducial marker. The interface between a narrow field-of-view tracker instance and the Shared Pose is illustrated in FIG. 10, with the basic process of FIG. 7 used for the narrow field-of-view sensor, but further including the fetching of a global pose at 310 from the shared fiducial global pose 320. The narrow field-of-view sensor updates the shared fiducial global pose at 330, and the shared fiducial global pose is updated from other tracker instances at 340. If the fiducial global pose is found at the shared global pose 320, it is returned to the narrow field-of-view pose estimation at 350 and the process described in FIG. 7 continues.

For the shared fiducial global pose system to operate, a calibration process is conducted. The dynamic extrinsics are first calibrated for each pan-tilt unit mounted narrow field-of-view sensor with a wide field-of-view sensor designated as the reference global frame. This ensures a relationship between all sensors in the system. If there are multiple wide field-of-view sensors, the system designates one of them as the reference global frame and all other wide field-of-view sensors are calibrated with respect to the reference global frame with a standard camera extrinsics calibration process, such as those available in OpenCV.

Embodiments described herein will provide fiducial estimates even if one or more sensors fail as long as there is at least one narrow field-of-view sensor or wide field-of-view sensor still functioning. The fiducial marker pose estimation of an example embodiment is further refined by combining the pose information asynchronously received over time by using a process such as Kalman filter, achieving higher accuracy estimates than any single narrow field-of-view or wide field-of-view sensor. According to an example implementation, a simple and deterministic rule is used to decide which pose is being returned at 350 to a "fetch global fiducial pose" request 310. For example, if the Shared Pose contains pose estimates from the wide field-of-view camera, then the system returns the pose from the wide field-of-view camera. Otherwise, pose estimates from another narrow field-of-view camera will be returned if available.

FIG. 1 illustrates a flowchart depicting methods according to an example embodiments of the present disclosure for determining a three-dimensional position and orientation of a fiducial marker and, more particularly, to determining the three-dimensional position and orientation of a fiducial marker and tracking the three-dimensional position and orientation across different fields-of-view. It will be understood that each block of the flowchart of FIG. 1 and the flowcharts of FIGS. 7, 8, and 10 and combination of blocks in the flowchart are implemented by various means, such as hardware, firmware, processor, circuitry, and/or other communication devices associated with execution of software including one or more computer program instructions. For example, one or more of the procedures described above are embodied by computer program instructions. In this regard, the computer program instructions which embody the procedures described above are stored by a memory, such as a memory in control system 28 of apparatus 20 employing an embodiment of the present invention and executed by a processor of the apparatus. As will be appreciated, any such computer program instructions are loaded onto a computer or other programmable apparatus (for example, hardware) to produce a machine, such that the resulting computer or other programmable apparatus implements the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, are implemented in some embodiments by special purpose hardware-based computer systems which perform the specified functions, or combinations of special purpose hardware and computer instructions.

In an example embodiment, an apparatus for performing the method of FIG. 1 above comprises a processor configured to perform some or each of the operations (1-5, 100-140, 200-225, and/or 310-350) described above. The processor is, for example, configured to perform the operations (1-5, 100-140, 200-225, and/or 310-350) by performing hardware implemented logical functions, executing stored instructions, or executing algorithms for performing each of the operations. Alternatively, the apparatus comprises means for performing each of the operations described above. In this regard, according to an example embodiment, examples of means for performing operations 1-5, 100-140, 200-225, and/or 310-350 comprise, for example, a processor of a control system 28 and/or a device or circuit for executing instructions or executing an algorithm for processing information as described above.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An apparatus for tracking a three-dimensional location and orientation of a fiducial marker across two or more fields-of-view, the apparatus comprising:
   a first sensor having a first field-of-view configured to acquire a first image of a workspace in which the fiducial marker is disposed;
   a control system configured to determine the three-dimensional location and orientation of the fiducial marker within the workspace based on the first image of the workspace in which the fiducial marker is disposed; and
   a second sensor having a second field-of-view configured to acquire a second image of a second space, different from the workspace,
   wherein the control system calculates first pan and tilt information for the second sensor to move the second field-of-view of the second sensor to acquire a fiducial marker image, and
   wherein the control system is configured to determine the three-dimensional location and orientation of the fiducial marker within the second space based on the fiducial marker image.

2. The apparatus of claim 1, wherein the first sensor comprises a wide field-of-view sensor, wherein the second sensor comprises a narrow field-of-view sensor, and wherein the second space is of a portion of the workspace.

3. The apparatus of claim 2, further comprising a third sensor comprising a narrow field-of-view sensor configured to capture a third image of a third space, wherein the third space is of a portion of the workspace that does not overlap the second space, the control system configured to provide the three-dimensional location and orientation of the fiducial marker as it moves from the second space to the third space based on images captured by the first sensor.

4. The apparatus of claim 1, wherein the three-dimensional location and orientation of the fiducial marker within the workspace is determined in a global coordinate frame, and wherein the three-dimensional location and orientation of the fiducial marker within the second space is determined in the global coordinate frame.

5. The apparatus of claim 1, further comprising a first pan-tilt unit supporting the second sensor to controllably alter a first pan angle and a first tilt angle at which the second sensor is positioned relative to the fiducial marker such that the second sensor is configured to acquire images of the fiducial marker at different pan and tilt angles.

6. The apparatus of claim 5, wherein the control system is further configured to cause the first pan-tilt unit to move according to the first pan and tilt information for the second sensor.

7. The apparatus of claim 6, further comprising:
   a third sensor having a third field-of-view configured to acquire a third image of a third space, different from the workspace and the second space; and
   a second pan-tilt unit supporting the third sensor and to controllably alter a second pan angle and a second tilt angle at which the third sensor is positioned,
   wherein the control system is further configured to cause the second pan-tilt unit to move according to calculated second pan and tilt information for the third sensor based on the three-dimensional location and orientation of the fiducial marker within the second space.

8. A method for tracking a three-dimensional location and orientation of a fiducial marker across two or more fields-of-view, the method comprising:
   capturing a first image of a workspace in which the fiducial marker is disposed with a first sensor having a first field-of-view;
   determining the three-dimensional location and orientation of the fiducial marker within the workspace based on the first image of the workspace in which the fiducial marker is disposed;
   capturing a second image of a second space in which the fiducial marker is disposed with a second sensor having a second field-of-view calculating first pan and tilt information for the second sensor to move the second field-of-view of the second sensor to acquire a fiducial marker image; and determining the three-dimensional location and orientation of the fiducial marker within the second space based on the fiducial marker image.

9. The method of claim 8, wherein the first sensor comprises a wide field-of-view sensor, wherein the second sensor comprises a narrow field-of-view sensor, and wherein the second space is of a portion of the workspace.

10. The method of claim 9, further comprising:
capturing a third image of a third space with a third sensor having a narrow field-of-view, wherein the third space is of a portion of the workspace that does not overlap the second space; and providing the three-dimensional location and orientation of the fiducial marker as it moves from the second space to the third space based on images captured by the first sensor.

11. The method of claim 8, wherein the three-dimensional location and orientation of the fiducial marker within the workspace is determined in a global coordinate frame, and wherein three-dimensional location and orientation of the fiducial marker within the second space is determined in the global coordinate frame.

12. The method of claim 8, further comprising controllably altering a first pan angle and a first tilt angle at which the second sensor is positioned relative to the fiducial marker with a first pan-tilt unit attached to the second sensor such that the second sensor is configured to acquire images of the fiducial marker at different pan and tilt angles.

13. The method of claim 12, further comprising causing the first pan-tilt unit to move according to the first pan and tilt information for the second sensor.

14. The method of claim 13, further comprising:
acquiring a third image of a third space, different from the workspace and the second space with a third sensor having a third field-of-view;

controllably altering a second pan angle and a second tilt angle at which the third sensor is positioned using a second pan-tilt unit supporting the third sensor; and causing the second pan-tilt unit to move according to calculated second pan and tilt information for the third sensor based on the three-dimensional location and orientation of the fiducial marker within the second space.

15. A system for tracking a three-dimensional location and orientation of a fiducial marker across two or more fields-of-view, the system comprising:

a wide field-of-view camera configured to acquire a first image of a workspace in which the fiducial marker is disposed a control system configured to determine the three-dimensional location and orientation of the fiducial marker within the workspace based on the first image of the workspace in which the fiducial marker is disposed;

a narrow field-of-view camera configured to acquire a second image of a second space, different from the workspace, where the second space is a portion of the workspace; and a first pan-tilt unit coupled to the narrow field-of-view camera configured to controllably adjust a first pan angle and a first tilt angle of the narrow field-of-view camera to capture different areas of the workspace, wherein the control system calculates first pan and tilt information for the narrow field-of-view camera to move a field-of-view of the narrow field-of-view camera using the first pan-tilt unit to acquire a fiducial marker image, wherein the control system is configured to determine the three-dimensional location and orientation of the fiducial marker within the second space based on the fiducial marker image.

16. The system of claim 15, wherein the narrow field-of-view camera is a first narrow field-of-view camera, the system further comprising a second narrow field-of-view camera configured to capture a third image of a third space, wherein the third space is of a portion of the workspace that does not overlap the second space, the control system configured to provide the three-dimensional location and orientation of the fiducial marker as it moves from the second space to the third space based on images captured by the wide field-of-view camera.

17. The system of claim 15, wherein the three-dimensional location and orientation of the fiducial marker within the workspace is determined in a global coordinate frame, and wherein three-dimensional location and orientation of the fiducial marker within the second space is determined in the global coordinate frame.

18. The system of claim 15, wherein the control system is further configured to cause the first pan-tilt unit to move according to the first pan and tilt information for the narrow field-of-view camera.

19. The system of claim 15, wherein the narrow field-of-view camera is a first narrow field-of-view camera, the system further comprising:

a second narrow field-of-view camera configured to acquire a third image of a third space, different from the workspace and the second space; and a second pan-tilt unit supporting the second narrow field-of-view camera and to controllably alter a second pan angle and a second tilt angle at which the second narrow field-of-view camera is positioned, wherein the control system is further configured to cause the second pan-tilt unit to move according to calculated second pan and tilt information for the second narrow field-of-view camera based on the three-dimensional location and orientation of the fiducial marker within the second space.

20. The system of claim 15, wherein the control system is configured to determine the three-dimensional location and orientation of the fiducial marker within the second space based on the fiducial marker image of the second space and based on a dynamic extrinsic model of the narrow field-of-view camera.

* * * * *